(12) United States Patent
Subramanian

(10) Patent No.: US 6,807,155 B1
(45) Date of Patent: Oct. 19, 2004

(54) METHOD OF PROFILING DISPARATE COMMUNICATIONS AND SIGNAL PROCESSING STANDARDS AND SERVICES

(75) Inventor: Ravi Subramanian, Mountain View, CA (US)

(73) Assignee: Infineon Technologies AG (DE)

(*) Notice: Subject to any disclaimer, the term of this patent is extended or adjusted under 35 U.S.C. 154(b) by 0 days.

(21) Appl. No.: 09/565,654

(22) Filed: May 5, 2000

Related U.S. Application Data

(60) Provisional application No. 60/133,130, filed on May 7, 1999.

(51) Int. Cl.7 .............................................. G08C 15/00
(52) U.S. Cl. ...................................... 370/252; 370/465
(58) Field of Search ................................ 370/252, 310, 370/465, 466, 328, 479, 498, 342, 400, 338; 709/104, 227, 230, 236; 455/552, 553, 554, 552.1, 553.1, 554.1, 554.2; 700/97; 713/322; 712/35, 36

(56) References Cited

U.S. PATENT DOCUMENTS

| | | | |
|---|---|---|---|
| 5,359,523 A | * 10/1994 | Talbott et al. .............. 700/97 |
| 5,740,458 A | * 4/1998 | Chauvel et al. ............. 712/36 |
| 6,006,105 A | * 12/1999 | Rostoker et al. ........... 370/465 |
| 6,012,136 A | * 1/2000 | Brown ....................... 712/35 |
| 6,169,733 B1 | * 1/2001 | Lee .......................... 370/342 |
| 6,198,730 B1 | * 3/2001 | Hogberg et al. ........... 370/335 |
| 6,243,589 B1 | * 6/2001 | Novel ....................... 455/552 |
| 6,278,697 B1 | * 8/2001 | Brody et al. ............... 370/310 |

FOREIGN PATENT DOCUMENTS

WO    WO 9523485 A1 * 8/1995    ............ H04Q/7/20

* cited by examiner

Primary Examiner—Chi Pham
Assistant Examiner—Keith George
(74) Attorney, Agent, or Firm—Darby & Darby

(57) ABSTRACT

A method of profiling disparate communications and signal processing standards. The method begins with selection of a set of communications and signal processing standards for analysis. Next, functions performed by the set of communications and signal processing standards are identified and ranked according to computational intensity. A set of high computational intensity functions are then selected for implementation as kernels, the set of kernels forming a programmable processor that enables implementation of any one of the set of communications and signal processing standards.

2 Claims, 14 Drawing Sheets

| Parameter Estimation Sub Functions | TDMA | | | | CDMA | | | | |
|---|---|---|---|---|---|---|---|---|---|
| | IS136 | GSM | GPRS | EDGE | IS-95B | IS-2000 | WCDMA-FDD | GPS | Globalstar |
| LMS Channel Estimator | | | X | X | | | | | |
| Windowed Average Energy Estimator | X | X | X | X | X | X | X | | |
| ML Symbol Timing Estimator | X | X | X | X | X | X | X | X | X |
| ML Carrier Phase Estimator | X | X | X | X | X | X | X | X | X |
| PN Correlator | | | | | X | X | X | | |
| Matched Filter | | | | | | | X | X | X |
| Interference Energy Estimator | | | | | | X | X | | |

FIG. 4

| | Rx Filter | Complex Despreader | short code | Scrambling | Walsh |
|---|---|---|---|---|---|
| CGU overhead | | | 3 | 3 | |
| DLL error signal (non coherent) | 242 | 12 | 3 | 0 | |
| DLL error signal (coherent) | | 12 | | | |
| Pilot | | 6 | 3 | 3 | 4 |
| R-FCH | | | | | 4 |
| R-DCCH | | | | | 4 |
| R-SCH1 | | | | | 4 |
| R-SCH2 | | | | | 4 |

FIG. 5

Example for
Add-Compare-Select logs of Viterbi Algorithm

Viterbi Algorithm; M = # of states, K = observation period

STORAGE:

| | | |
|---|---|---|
| k | time index | |
| $\hat{X}(X_k)$ | $1 \leq X_k \leq M$ | Survivor terminating in $X_k$ |
| $\Gamma(X_k)$ | $1 \leq X_k \leq M$ | Survivor length |

INITIALIZATION k = 0

$\hat{X}(X_o) = X_o$ ;   $\hat{X}(m)$ arbitrary; $m \neq X_o$ $\Gamma(X_o) = 0$ ;   $\Gamma(m) = \infty$ ; $m \neq X_o$

*FIG. 7A*

ACS RECURSION $$\Gamma(X_{k+1}, X_k) \triangleq \Gamma(X_k) + \lambda[\zeta_k = (X_{k+1}, X_k)]$$

for all $\zeta_k = (X_{k+1}, X_k)$ transitions

COMPUTE $$\Gamma(X_{k+1}) = \min_{X_k} \Gamma(X_{k+1}, X_k) \text{ for each } X_{k+1}$$

STORE $\Gamma(X_{k+1})$ and corresponding survivor $\hat{X}(X_{k+1})$

Set k k+1, and repeat until k = K

*FIG. 7B*

Example to
FIR FILTER $$y(n) = \sum_{k=0}^{N} X(k)\, a(n-k)$$

filter coefficients    $a(k)$; typically symmetric filter
input $x(k)$
output $y(k)$

METHOD OF PROFILING DISPARATE COMMUNICATIONS AND SIGNAL PROCESSING STANDARDS AND SERVICES

CROSS REFERENCE TO RELATED APPLICATION

This application claims priority from the Provisional Application entitled "Apparatus and Method for Profiling Disparate Communications and Signal Processing Standards and Services", U.S. Ser. No. 60/133,130, filed May 7, 1999.

BRIEF DESCRIPTION OF THE INVENTION

This invention relates generally to the design of multi-function digital devices. More particularly, this invention relates to a technique for profiling disparate communications and signal processing standards and services to facilitate the development of an application-specific processor.

BACKGROUND OF THE INVENTION

Signal processing protocols and standards have proliferated with advances in wireless communications devices and services. Current communications protocols include Frequency Division Multiplexing (FDM), Time Division Multiple Access (TDMA) and Code Division Multiple Access (CDMA). The United States, Europe, Japan and Korea have all developed their own standards for each communications protocol. TDMA standards include Interim Standard-136 (IS-136), Global System for Mobile (GSM), and General Packet Radio Service (GPRS). CDMA standards include Global Positioning System (GPS), Interim Standard-95 (IS-95) and Wide Band CDMA (WCDMA). Wireless communications services include paging, voice and data applications.

Until recently wireless communications devices supported a single communications standard. In theory, a wireless communications device can be designed using a general purpose Digital Signal Processor (DSP) that would be programmed to realize a set of functional blocks specifying the minimum performance requirements for the application. To achieve these minimum performance requirements, system designers design algorithms (sequences of arithmetic, trigonometric, logic, control, memory access, indexing operations, and the like) to encode, transmit, and decode signals. These algorithms are typically specified in software. The set of algorithms which achieve the target performance-specification is collectively referred to as the executable specification. This executable specification can then be compiled and run on the DSP, typically via the use of a compiler. Despite the increasing computational power and speeds of general purpose DSPs and decreasing memory cost and size, designers have not been able to satisfy cost, power and speed requirements simply by programming a general purpose DSP with the executable specification for a standard-specific application.

Additional dedicated high-speed processing is required, a need which has traditionally been met using an application-specific processor. As used herein, an application-specific processor is a processor that excels in the efficient execution (power, area, flexibility) of a set of algorithms tailored to the application. An application-specific processor fares extremely poorly for algorithms outside the intended application space. In other words, the improved speed and power efficiency of application-specific-processors comes at the cost of function flexibility.

Demand is now growing for wireless communications devices that support multiple applications and varying grades of services over multiple standards. Today's solution to this problem is to essentially connect multiple application-specific processors together to obtain multi-standard operation, thereby adding cost in terms of design resources, design time, and silicon area. FIG. 1 illustrates, in block diagram form, a wireless communications device designed with this approach. FIG. 1 includes a microcontroller core 20 and a DSP 22 having access to a memory 24. The wireless communications device also includes a set of application-specific fixed function circuits 26A–26D, including an AMPS circuit 26A, a CDMA circuit 26B, an IS-136 circuit 26C, and a GSM circuit 26D.

In view of the foregoing, it would be highly desirable to eliminate application-specific communications and signal processors by providing a technique for profiling disparate communications and signal processing standards to facilitate the implementation of a single processor to support the disparate communications and signal processing standards in a cost, area and power efficient fashion.

SUMMARY OF THE INVENTION

The method of the present invention profiles disparate communications and signal processing standards to define a programmable processor that may be programmed to execute any of the disparate communications and signal processing standards. The method includes the steps of selecting a set of communications and signal processing standards for analysis and identifying functions common to the selected set of communications and signal processing standards. Thereafter, the common functions are ranked according to computational intensity. Using this ranking, a set of high computational intensity functions are selected for implementation as kernels, the set of kernels forming a programmable processor with which any one of the set of communications and signal processing standards can be implemented.

The invention enables the identification of optimum datapaths and control state-machines for use in the design of application-specific processors. The methodology can be used to identify functions that are poorly executed by existing microprocessors and digital signal processors. The technique can also define new datapaths and state-machines required to efficiently implement functions. The methodology of the invention offers a systematic way to analyze functions across many applications or standards, thereby reducing the time to define a processor architecture and increasing the amount of design reuse possible in the design of new processors for digital signal processing of multi-standard applications.

BRIEF DESCRIPTION OF THE DRAWINGS

For a better understanding of the invention, reference should be made to the following detailed description taken in conjunction with the accompanying drawings, in which:

FIG. 4 illustrates a set of sub-functions for implementing a Parameter Estimator.

FIG. 5 illustrates a table ranking sub-functions according to computational intensity.

FIG. 7A illustrates a first portion of a method of identifying the components of an add-compare-select loop of a Viterbi algorithm.

FIG. 7B illustrates a second portion of a method of identifying the components of an add-compare-select loop of a Viterbi algorithm.

Like reference numerals refer to corresponding parts throughout the drawings.

DETAILED DESCRIPTION OF THE INVENTION

Figure 1:
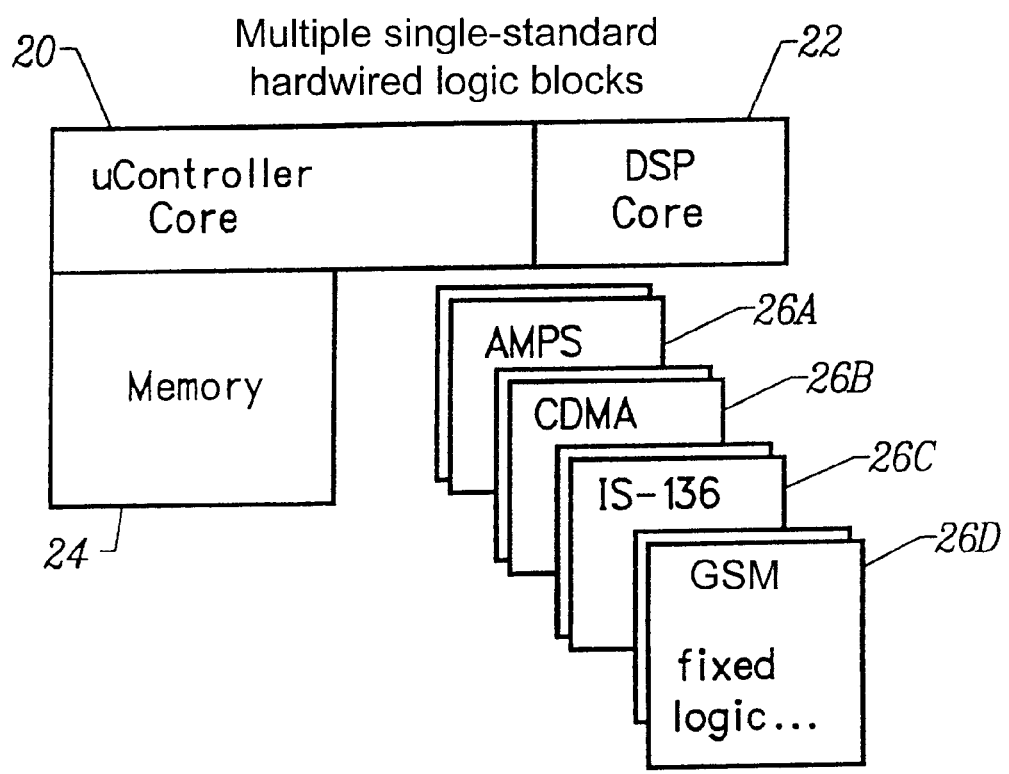
FIG. 1 illustrates a prior art communications and signal processing system utilizing a set of application-specific processors.
Figure 2:
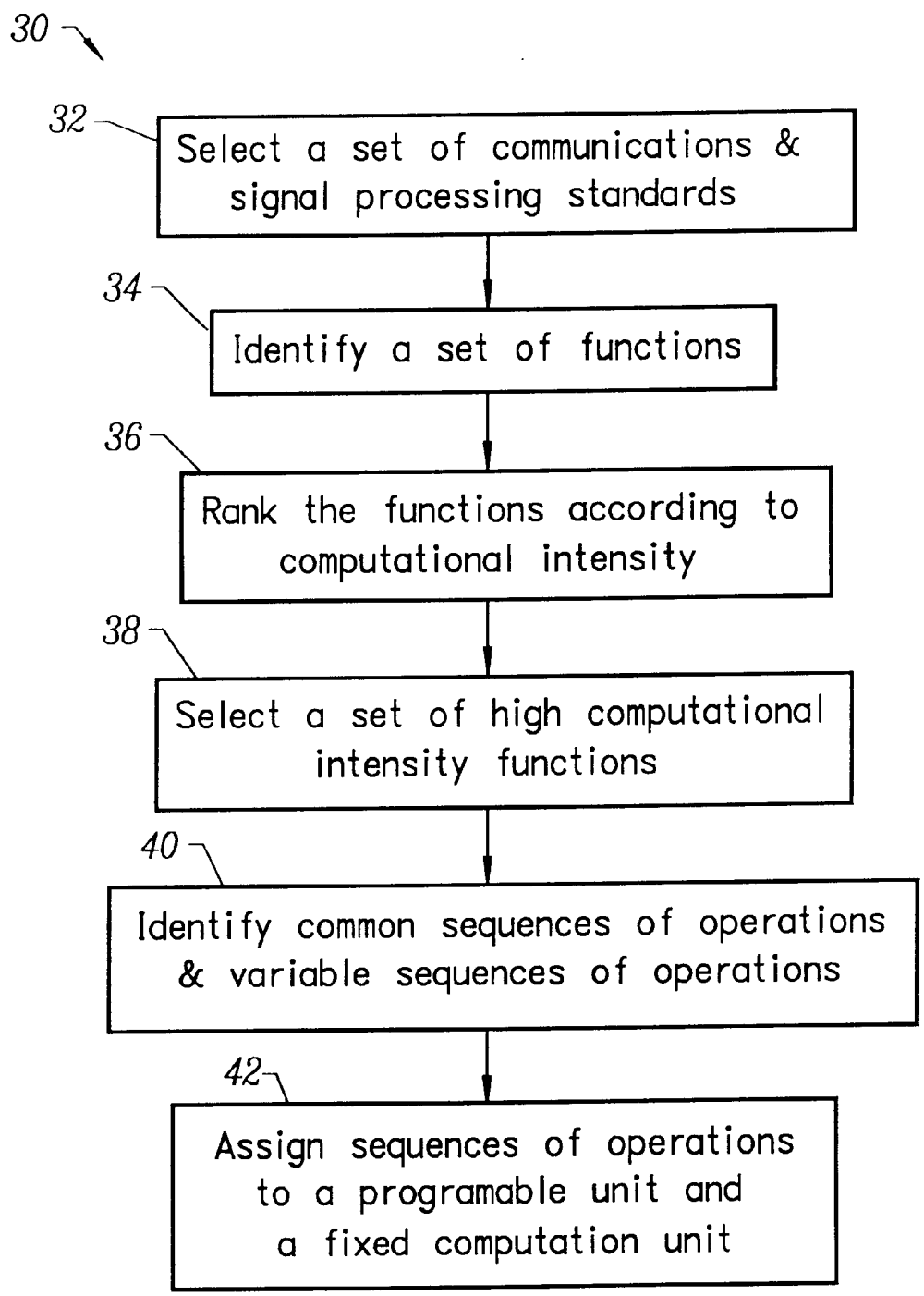
FIG. 2 illustrates the steps of profiling communications and signal processing functions across multiple standards in accordance with an embodiment of the invention.

FIG. 2 illustrates the steps 30 of the method of the present invention for profiling and analyzing functions across many signal processing applications to design a processor that can be programmed to efficiently execute the algorithms associated with any of the profiled signal processing standards or applications. The process of FIG. 2 will reduce the time to define a processor architecture and increases the amount of design reuse possible in the design of new processors for digital signal processing of multi-standard applications. Briefly described, the method of the present invention begins with the selection of a set of communications and signal processing standards and services for analysis. Next, functions common to the selected set of communications and signal processing standards are identified. Thereafter, the common functions are ranked according to computational intensity and a set of high computational intensity functions are selected for implementation as programmable kernels, these kernels forming a programmable multi-standard processor.

First during step 32 a set of communications and signal processing standards are selected for analysis from the set of possible standards. Any arbitrary set of standards may be selected in compliance with the present invention; however, it is likely that the standards selected will be influenced by the target market for the programmable processor being designed. For example, the target market might be manufacturers of wireless mobile devices intended for sale in Japan.

A. Identifying Common Canonical Functions

Figure 3:
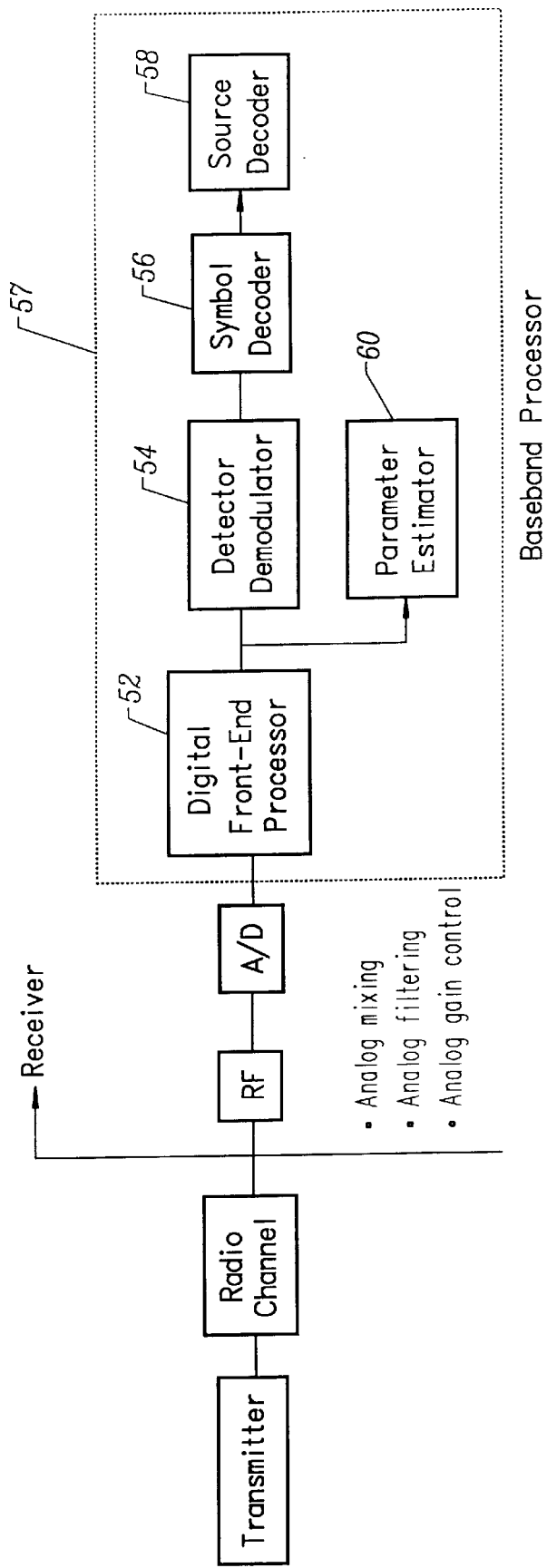
FIG. 3 illustrates the canonical function blocks of a receiver.

Still referring to FIG. 2, after a set of communications and signal processing standards have been selected, a set of common functional blocks are identified for the selected application during step 34. As an example, FIG. 3 illustrates the functional blocks when the selected application is Baseband Processor 51 of a receiver. The functional blocks to be implemented are Digital Front-End Processor 52, Detector/Demodulator 54, Symbol Decoder 56, Source Decoder 58, and Parameter Estimator 60. For each of the functional blocks of Baseband Processor 51, each of the selected communications and signal processing standards will specify a number of sub-functions. For example, consider FIG. 4, which illustrates in tabular form the set of sub-functions to implement Parameter Estimator 60 for a number of standards. Many Parameter Estimation sub-functions are common to multiple standards. For example, IS-136, GSM, GPRS, EDGE, IS-95B, IS-2000 and WCDMA-FDD all use the Windowed Average Energy Estimator.

B. Ranking Functions

FIG. 2 illustrates that during step 36 the functional blocks are ranked to identify functions ill-suited to realization via programming of a general purpose DSP. Stated another way, the functions are ranked to identify those suited to implementation via an application-specific multi-standard processor. This is a multi-step process that begins with generating the executable specification for each function across the selected communications and signal processing standards. Preferably, the executable specification is coded using either the C or C++ language. The executable specification for each standard may then be ranked using a number of metrics. One useful metric is the computational intensity of each function. The computational intensity of each function may be determined using dynamic profiling of each executable specification to quantify the associated number of millions-of-operations-per-second (MOPS). This may be done via simulations and automated test benches. The results may be presented in a table demonstrating which functions have the highest MOPS. This characterization can be made with a generic processor or with respect to a particular digital signal processor or microprocessor. If a characterization is made with respect to a specific processor, the executable specification must run on that processor for profiling purposes. The table that results from this exercise shows functions for which the instruction set architecture, datapath, or memory bandwidth of the native processor is not necessarily well-suited.

FIG. 5 illustrates a portion of such a table, which includes MOPS for a single standard and a subset of sub-functions of Baseband Processor 51 (see FIG. 3). The computational intensity of each sub-function is indicated for a subset of the channels supported by Baseband Processor 51. FIG. 5 indicates that the Receive (Rx) Filter is the most computationally intensive of the listed sub-functions and, as such, is the best suited for implementation in a programmable application-specific processor. FIG. 5 also indicates that the Complex Despreader is computationally intensive and well-suited to implementation is a programmable application-specific processor. Other sub-functions likely to be computationally intensive, but which are not illustrated in FIG. 5, are RAKE receivers, Turbo Coders, Interference Cancellers, Multi-user Detectors and Searchers.

Other metrics that may be used to rank the functions across the selected set of communications and signal processing standards include power consumption and silicon area. Determining the power consumption of each function requires identifying the amount of time spent by the function on each of a set of operation types. The set of operation types includes move-and-transfer, loop-and-control, trigonometric and arithmetic. Each type of operation consumes some number of mW per operation. Thus, given the number of operations of each type the total power consumption of each function can be determined across the selected set of communications and signal processing standards. Such an analysis is likely to reveal that RAKE receivers tend to consume a great deal of power as compared to other sub-functions. The silicon area required to store the executable code can be estimated for each function across the selected set of communications and signal processing standards by counting the number and types of operations required for each of the executable specifications, and then using a cost table showing the cost in silicon areas for each operator. Once again, RAKE receivers are likely to require many more gates to store their executable code than are other sub-Functions.

After the functions have been ranked using the selected set of metrics, during step 38 (see FIG. 2) a set of highly ranked functions are selected for implementation and further analysis.

C. Analysis and Assignment of Highly Ranked Functions

Figure 6:
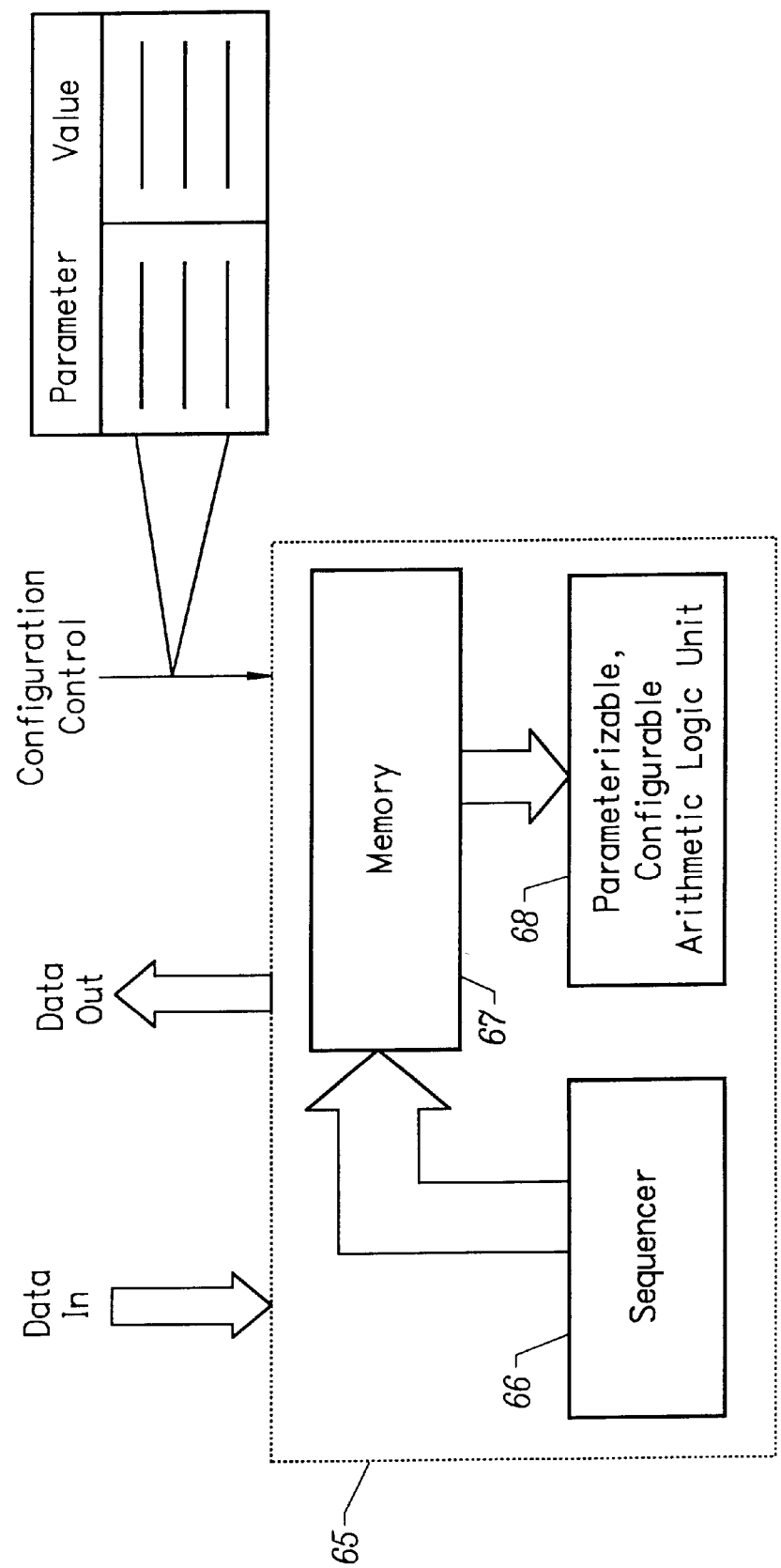
FIG. 6 illustrates a Kernel for implementing a function.

Referring again to FIG. 2, during step 40 the selected set of functions are analyzed for similarity across multiple standards to identify the computation kernels that are common across all instances of a function. (As used herein, kernel means a sequence of operations that may be represented by a control-dataflow graph and may be implemented in either software or hardware. FIG. 6 illustrates, in block diagram form, Kernel 65, which includes three modules: a Sequencer 66, a local Memory 67, and a parameterizable, configurable Arithmetic Logic Unit 68. ) In other words, during step 40 a function-centric, rather than an application-centric, approach is taken to profile functions.

Figure 7C:
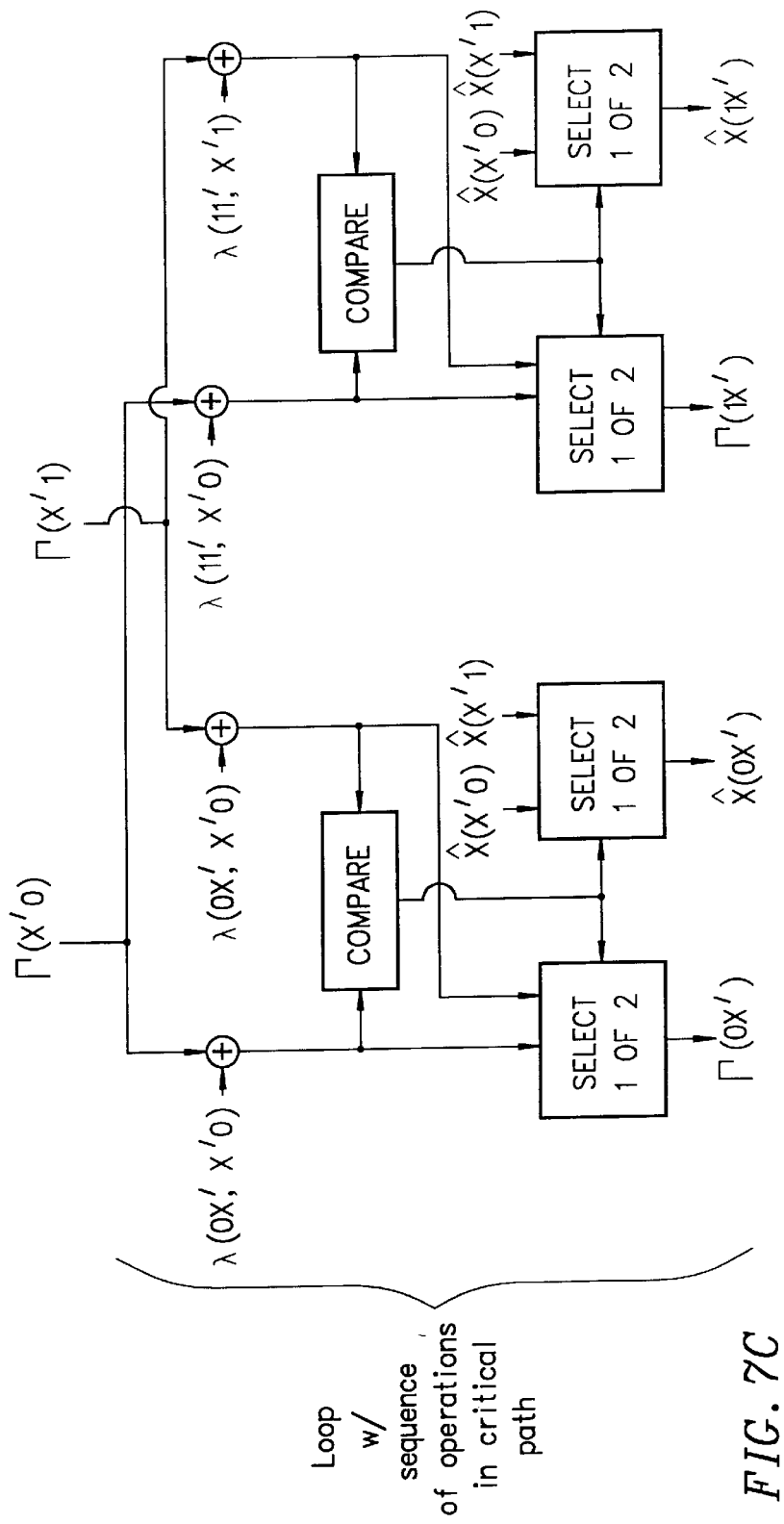
FIG. 7C illustrates a third portion of a method of identifying the components of an add-compare-select loop of a Viterbi algorithm.

The profiling of the functions begins with an executable specification of each "standard-specific" version of the function and a simulation to optimize all signal and variable word-widths. The profiling of functions includes identification of critical sequences of operations. Sequences of operations may involve move-and-transfer, loopand-control, trigonometric or arithmetic operations. As used herein, critical sequences of operations, or components, are those sequences of operations whose timely completion is necessary to performing a canonical function in a fixed period of time. As an example, FIGS. 7A–7C illustrate a method of identifying the components of an add-compare-select loop of a machine implemented Viterbi algorithm. A machine implemented Viterbi algorithm is a dynamic-programming algorithm employed in digital communications to find the most likely sequence of transmitted symbols in a digital transmission system. FIG. 7A describes the first two steps of a computer implemented Viterbi algorithm. FIG. 7B illustrates the third step of a machine implemented Viterbi algorithm, the add-compare recursion, which includes a compute stage and a survivor storage stage. FIG. 7C illustrates the data flow and control flow of the add-compare-select recursion of the computer implemented Viterbi algorithm. FIG. 7C shows the loop with the sequence of operations that are used during the recursion and the relationship between the sequence of operations for one iteration of the computer implemented Viterbi algorithm.

Figure 8:
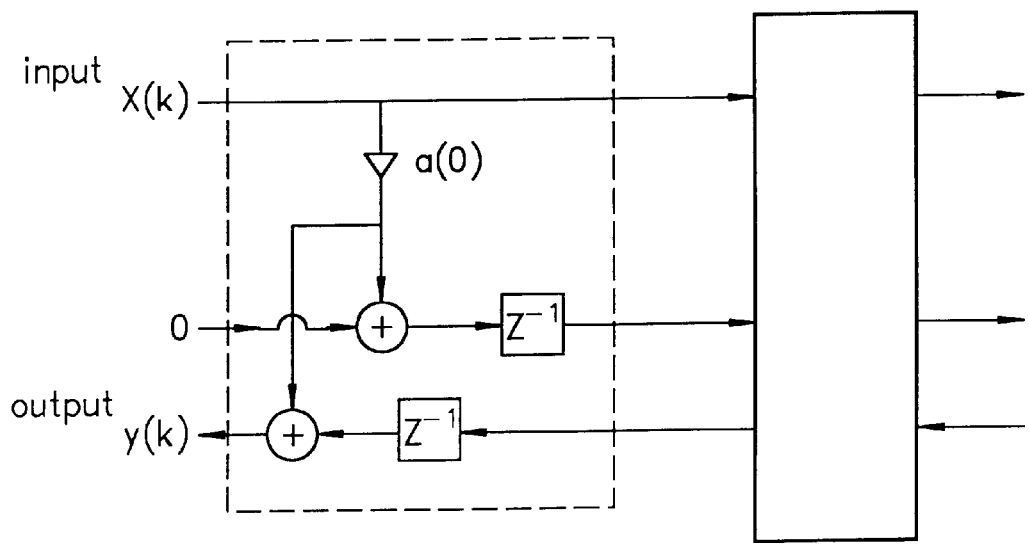
FIG. 8 illustrates a method of identifying the critical sequence of operations for a Finite Impulse Response Filter (FIR).

As yet another example of a method of identifying components of a canonical function, FIG. 8 illustrates a machine implemented method of identifying the critical sequence of operations for a Finite Impulse Response Filter (FIR). The illustrated equation describes mathematically the convolution of an input sequence x(n) with a set of filter coefficients a(n). The structure illustrated beneath the equation in FIG. 8 illustrates the most common subset of data flow and control flow operations in realization of the FIR. Highlighting in FIG. 8 illustrates the all the computation required for a single stage of the FIR.

After profiling the functions, the canonical functions are analyzed across multiple standards to identify the components that are common across all instances of the function, and those components that are variable. The process of profiling canonical functions is more fully appreciated with reference to FIG. 9. At the bottom of FIG. 9 a set of independent standards for wireless applications are listed, including GPS, IS-95 CDMA, W-CDMA, IS-136 TDMA, and GSM. A function profile for a particular application, in this case Baseband Processor 51, is listed on the left of FIG. 9. The canonical functions of Baseband Processor 51 include an MPSK frequency estimator, a convolutional decoder, a rake receiver, and an MLSE equalization unit.

Figure 9:
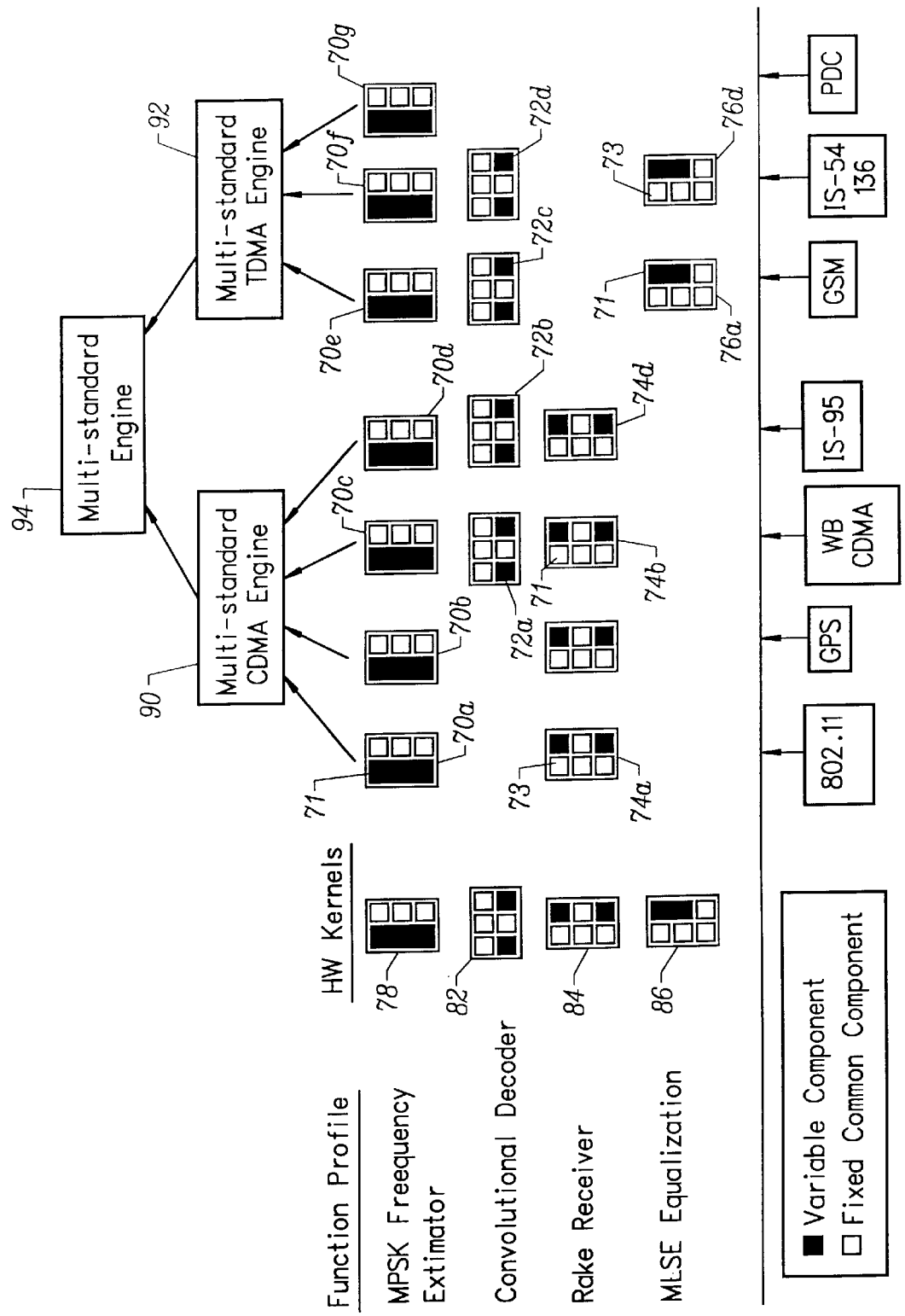
FIG. 9 illustrates the process of profiling canonical functions.

FIG. 9 represents as rectangles the Functional Component Collections 70a–g, 72a–d, 74a–d and 76a–b which make up each canonical function. Each rectangular Functional Component Collection is divided into a multiplicity of squares, with each square representing a single Component 71 &73. While Functional Component Collections 70, 72, 74 & 76 are illustrated as including six Components 71 &73, the number of Components 71 &73 per Functional Component Collection varies with each canonical function. For each Functional Component Collection 70, 72, 74 & 76 an arbitrary number of Components 71 &73 are included for purposes of illustration. In FIG. 9 Components 73 common to all Functional Component Collections for a canonical function are white, while those Components 71 which differ are black. An arbitrary number of variable and common Components are illustrated. Analysis of the Functional Component Collections 70a–70d for a MPSK Frequency Estimator reveals three Components 73 common to all CDMA standards and three Components 71 that vary with CDMA standard. This indicates a single set of Kernels may be designed to support all CDMA standards, provided that the set of Kernels is partially programmable to permit implementation of variable Components 71. In Similarly, analysis of the Functional Component Collections 70e–70g reveals three Components 73 common to all TDMA standards and three Components 71 that vary with TDMA standard. This permits a single set of Kernels to be designed to support all TDMA standards profiled, provided that the set of Kernels is partially programmable. (Partial programmability is necessary to allow implementation of the variable Components 73.) Indeed, profiling reveals that a single set of partially programmable Kernels 78 may be designed to support all CDMA and TDMA Functional Component Collections 70a–g. Analysis of the Functional Component Collections associated with the other canonical functions gives rise to similar conclusions. In other words, a single set of partially programmable Kernels 82 may be designed to support all Functional Component Collections 72a–72d associated with the Convolutional Decoder function; a single set of partially programmable Kernels 84 may be designed to support the Functional Component Collections 74a–74d associated with the Rake Receiver Function; and a single set of partially programmable Kernels 86 may be designed to support the Functional Component Collections 76a–76b associated with the MLSE Equalization function.

For those functions with extensive overlap, during step 42 (See FIG. 2) a partially programmable set of kernels, each with designed with a fixed computation unit and a programmable unit. As discussed with respect to FIG. 6, a Kernel 65 includes three modules 66, 67, 68, which form a computational unit. Preferably, Sequencer 66 and ALU 68 are partially programmable. Thus, those programmable parts of Sequencer 66 and ALU form the programmable computation unit, while Memory 67 and the fixed parts of Sequencer 66 and ALU 68 form the fixed computation unit. By programming a Kernel's programmable unit all of its Components 71 and 73 may be realized.

Referring again to FIG. 9, sets of partially programmable Kernels 78, 82, 84 and 86 enable creation of a multi-standard, protocol-specific Engines 90 and 94. Engine 90 is a standard-independent, CDMA-specific processor that includes a set of partially programmable set of Kernels for each canonical function of an application. Thus, Engine 90 may include, as an example, partially programable set of Kernels 78, 82, 84 and 86. Similarly, Engine 92 is a standard-independent, TDMA-specific processor that includes a set of partially programmable set of Kernels for each canonical function of an application. Additionally, given a partially programmable set of Kernels for each canonical function a multi-standard, protocol independent Engine 94 may be designed.

Figure 10:
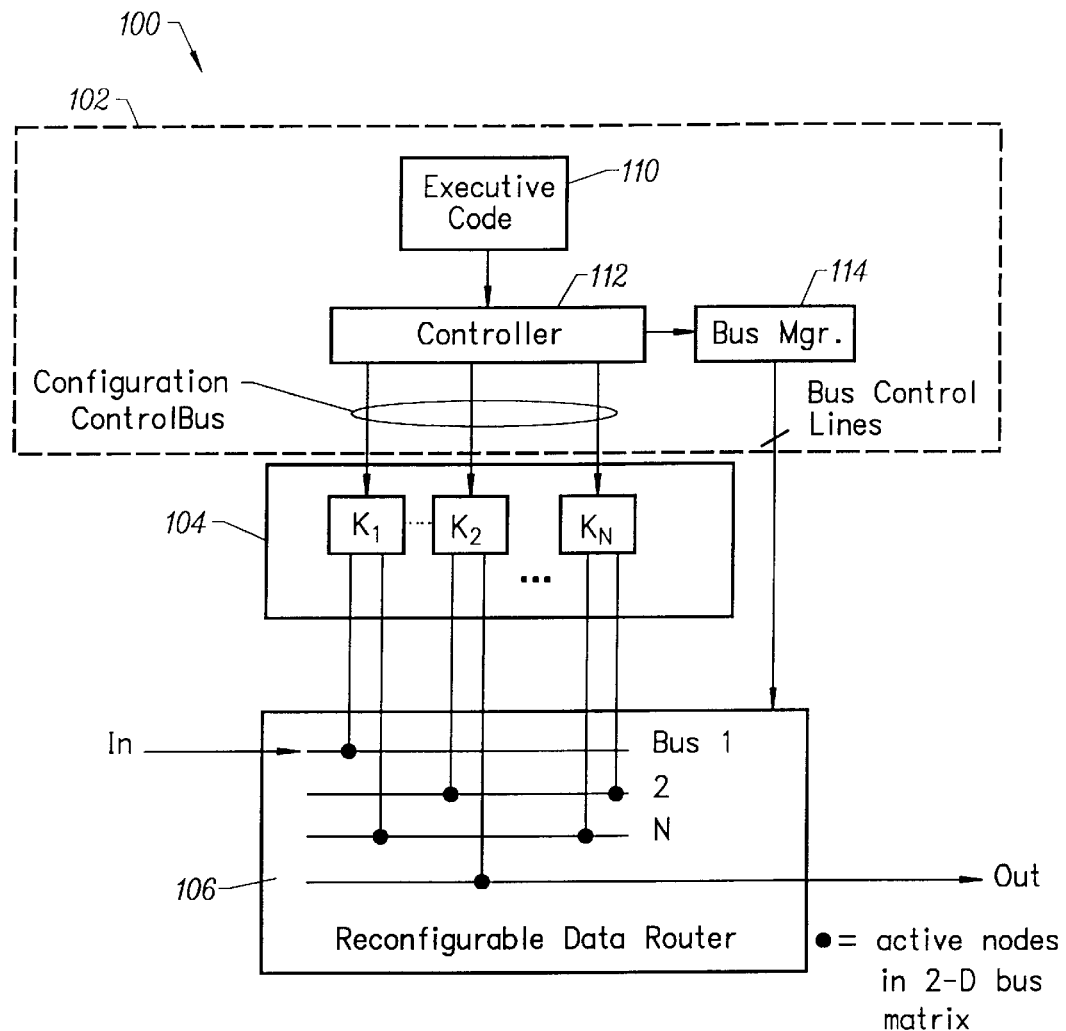
FIG. 10 illustrates a programmable multi-standard application-specific Processor.
Figure 11A:
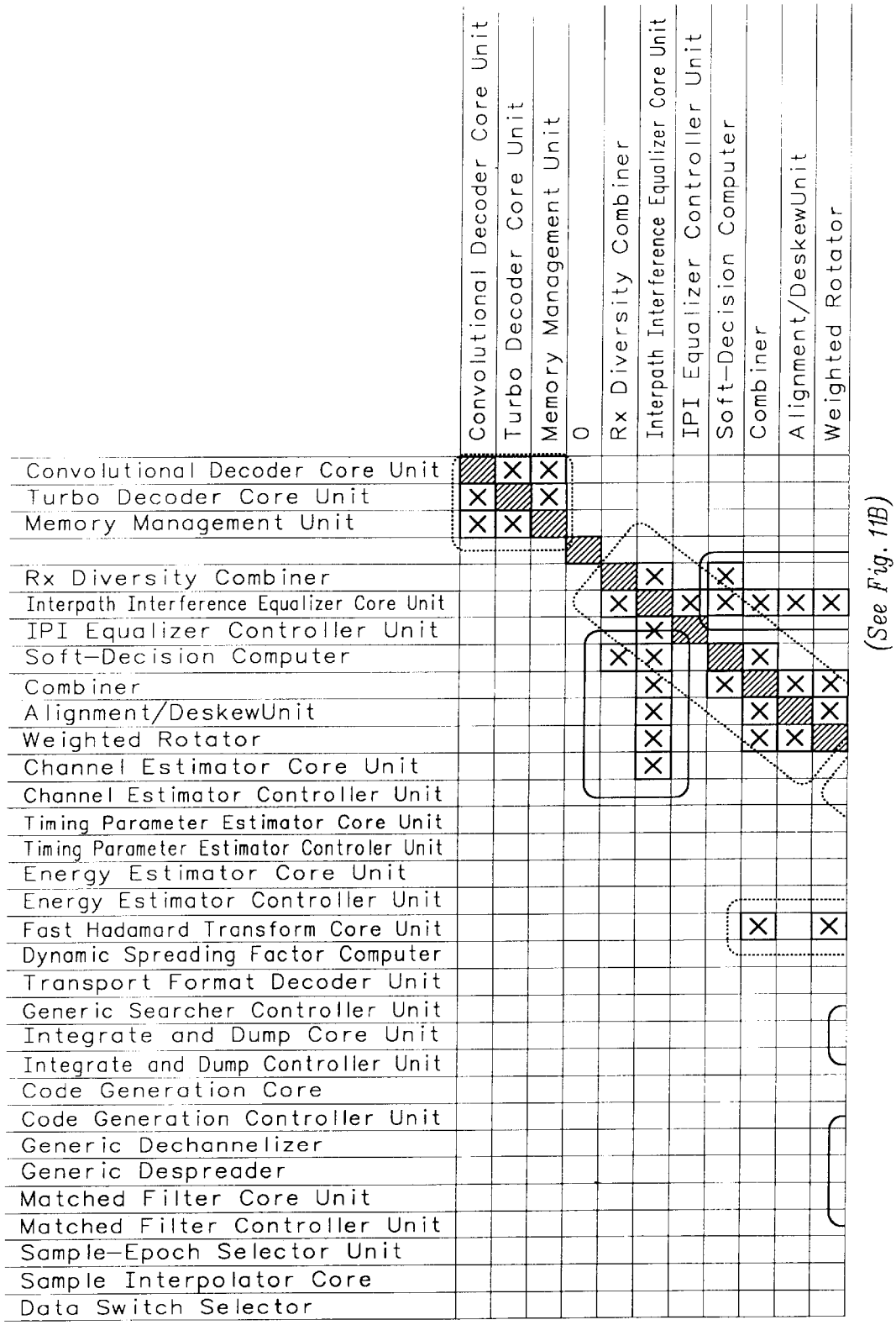
FIG. 11 illustrates an example of necessary programmable interconnections between Kernels for a given application.
Figure 11B:
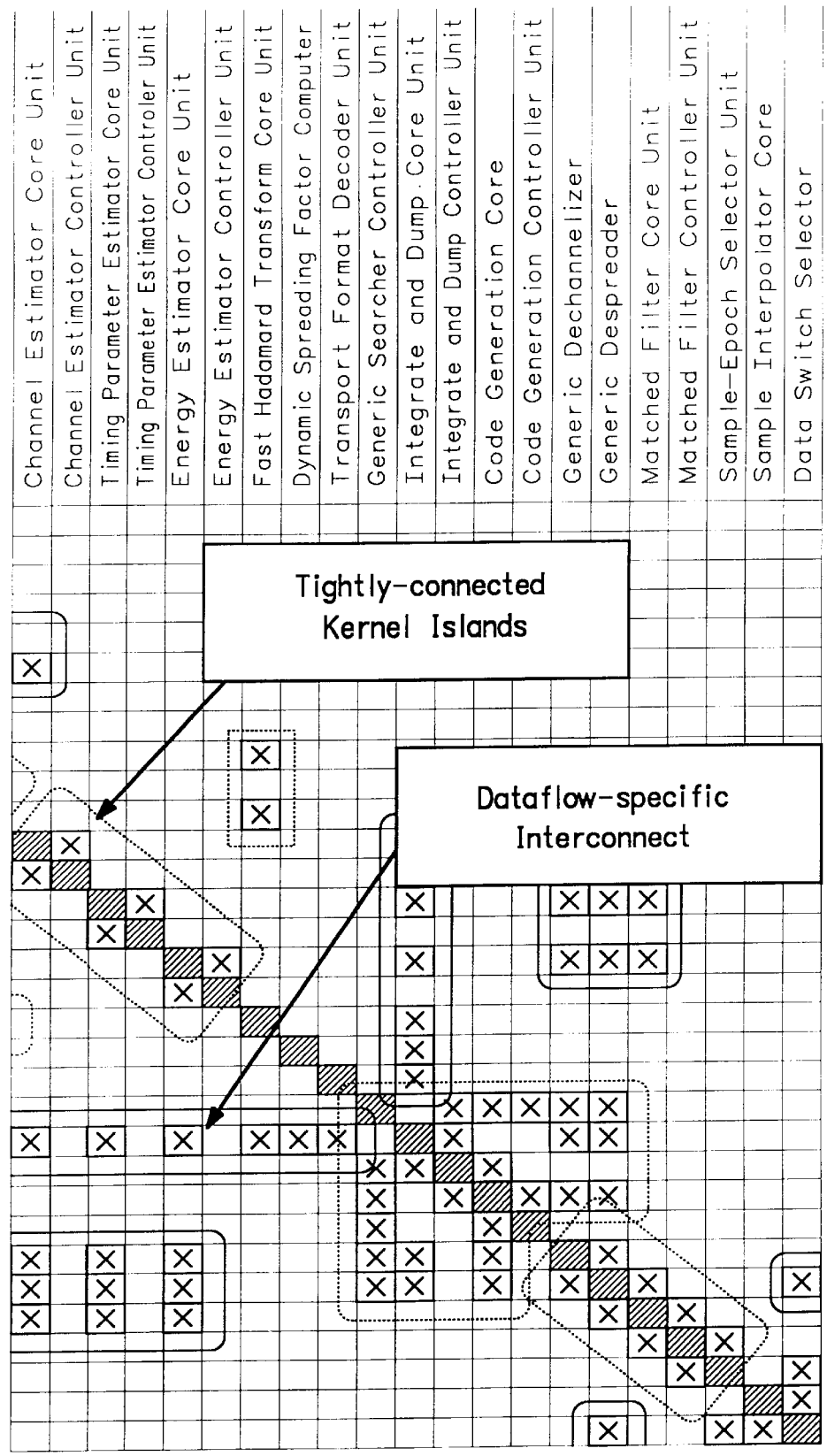

FIG. 10 illustrates, in block diagram form, a programmable, multi-standard, application-specific Processor 100. Processor 100 includes Program Control Unit 102, a Kernel Bank 104, and Reconfigurable Data Router 106. Program Control Unit 102 controls the programming of Kernel Bank 104 and Reconfigurable Data Router 106 so that Processor 100 may be configured to support any one of a set of supported standards. Program Control Unit 102 includes Memory 110, which stores executive code for programming Controller 112 and Bus Manager 114. Controller 112 controls the programming of the programmable units within each Kernel of Kernel Bank 104, while Bus Manager 144 controls the configuration of Reconfigurable Data Router 106. Kernel Bank 104 includes a multiplicity of Kernels, one for each canonical function of the application. Reconfigurable Data Router 106 routes data between Kernels as necessary to implement the application according to a particular standard. Reconfigurable Data Router 106 need not be completely programmable. FIG. 11 is an example of the interconnections between Kernels that must be programmable for a given application. The Kernels of the application are listed both at the top and to the left of FIG. 11. Interconnections that must be supported for the application are indicated by an x. For each Kernel there are relatively few interconnections that must be supported. For example, the Turbo Decoder Core kernel need only be capable of connecting to the Convolutional Decoder Core Unit kernel and the Memory Management Unit kernel.

Those skilled in the art will appreciate that the invention provides a systematic method for dealing with designing processors for multiple standards, multiple functions, and multiple parameters. In addition, the technique of the invention reduces processor design cycle time via function profiling and definition of datapath and control state-machine engines that can be reused across many processors.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A method of designing a programmable application-specific processor for wireless communication applications, the method comprising:

selecting a set of communications and signal processing standards for analysis;

identifying functions performed by the set of communications and signal processing standards;

ranking the functions according to computational intensity;

selectinig a set of high computational intensity functions for implementation as kernels; designing the programmable application-specific processor in accordance with the kernels selected;

profiling the high computational intensity functions across the set of communications and signal processing standards to identify a common set of sequences of operations and a variable set of sequences of operations; and defining each kernel as including a fixed computation unit to implement the common set of sequences of operations and a programmable unit to implement the variable set of sequences of operations, the kernels being programmable to implement any one of the set of communications and signal processing standards.

2. A method of designing a programmable application-specific processor for wireless communication applications, the method comprising:

selecting a set of communications and signal processing standards for analysis;

identifying functions performed by the set of communications and signal processing standards;

rankings the functions according to a set of metrics;

selecting a set of high ranked functions for implementation in accordance with a set of predefined design criteria; and designing the programmable application-specific processor to include the set of functions selected;

profiling the high ranked functions across the set of communications and signal processing standards to identify a common set of sequences of operations and a variable set of sequences of operations;

defining a kernel for each high ranked function, each kernel including a fixed computation unit to implement the common set of sequences of operations and a programmable unit to implement the variable set of sequences of operations; and designing the programmable application-specific processor as including the kernels for the high ranked functions, the kernels being programmable to permit the programmable processor to implement any one of the set of communications and signal processing standards.

* * * * *